US009520785B2

(12) United States Patent
Marsili et al.

(10) Patent No.: US 9,520,785 B2
(45) Date of Patent: Dec. 13, 2016

(54) NONLINEAR CONTROL LOOP FOR DC-DC CONVERTERS

(75) Inventors: Stefano Marsili, Faak am See (AT); Dietmar Straeussnigg, Villach (AT); Luca Bizjak, Villach (AT); Robert Priewasser, Klagenfurt (AT); Matteo Agostinelli, Villach (AT)

(73) Assignee: Infineon Technologies Austria AG, Villach (AT)

( * ) Notice: Subject to any disclaimer, the term of this patent is extended or adjusted under 35 U.S.C. 154(b) by 2109 days.

(21) Appl. No.: 12/620,076

(22) Filed: Nov. 17, 2009

(65) Prior Publication Data

US 2011/0115453 A1 May 19, 2011

(51) Int. Cl.
*H02M 3/158* (2006.01)
*H02M 1/00* (2006.01)

(52) U.S. Cl.
CPC ... *H02M 3/1582* (2013.01); *H02M 2001/0003* (2013.01)

(58) Field of Classification Search
USPC ................................. 323/259, 271, 225, 344
See application file for complete search history.

(56) References Cited

U.S. PATENT DOCUMENTS

| 6,166,527 | A | 12/2000 | Dwelley et al. |
| 6,414,469 | B1 * | 7/2002 | Zhou et al. .................. 323/272 |
| 7,276,861 | B1 * | 10/2007 | Shteynberg et al. ......... 315/291 |
| 7,994,762 | B2 * | 8/2011 | de Cremoux et al. ....... 323/271 |
| 2006/0164055 | A1 | 7/2006 | Hata et al. |
| 2008/0303502 | A1 | 12/2008 | Haiplik |

FOREIGN PATENT DOCUMENTS

WO 2007099174 A1 9/2007

* cited by examiner

*Primary Examiner* — Harry Behm
(74) *Attorney, Agent, or Firm* — Eschweiler & Associates, LLC (57) ABSTRACT

A nonlinear converter, such as a DC-DC converter, includes a nonlinear controller configured to receive an output voltage and a current, and configured to generate a PWM signal. The PWM signal is generated based on setting the converter to a first phase associated with both buck and boost modes when a clock signal is asserted, and selecting a second phase associated with the buck mode of the converter, if a sliding function signal achieves a first predetermined relationship with respect to a buck threshold before a next clock signal is asserted, or selecting a third phase associated with the boost mode of the converter, if the sliding function signal achieves a second predetermined relationship with respect to a boost threshold before a next clock signal is asserted. The nonlinear converter may include a power stage configured to provide the output voltage and a coil current to the nonlinear controller.

18 Claims, 6 Drawing Sheets

NONLINEAR CONTROL LOOP FOR DC-DC CONVERTERS

BACKGROUND

In modern communications systems, and particularly in mobile electronic devices, DC to DC converters are used to convert a DC input voltage (Vi) at one level to a desired DC output voltage (Vo) at another level. Such converters can accommodate conditions where the output voltage is smaller, larger, or about equal to the input voltage, in what are referred to as buck, boost, or buck/boost modes, respectively.

Accordingly, there is a continued need for an improved DC-DC converter and operational methods which minimize switching energy and transients which may be generated by configuration changes between operational modes and by line or load variations.

SUMMARY

The following presents a simplified summary in order to provide a basic understanding of one or more aspects of the disclosure. This summary is not an extensive overview, and is neither intended to identify key or critical elements of the disclosure, nor to delineate the scope thereof. Rather, the primary purpose of the summary is to present some concepts in a simplified form as a prelude to the more detailed description that is presented later.

In one embodiment, a nonlinear converter, such as a DC-DC power converter, includes a nonlinear controller configured to receive one or more or a combination of feedback variables (e.g., output voltage and/or coil current, and/or a battery voltage) from the power stage, and is configured to generate a PWM signal. The PWM signal is generated based on setting the converter to a first phase associated with both buck and boost modes of the converter when a clock signal is asserted, and selecting a second phase associated with the buck mode of the converter, if a sliding function signal achieves a first predetermined relationship with respect to a buck threshold before a next clock signal is asserted, or selecting a third phase associated with the boost mode of the converter, if the sliding function signal achieves a second predetermined relationship with respect to a boost threshold before a next clock signal is asserted.

In another embodiment, a nonlinear DC-DC converter includes a power stage configured to provide a coil current and an output voltage based on a PWM signal, and a nonlinear controller configured to receive the output voltage and the coil current from the power stage. The nonlinear controller is configured to generate the PWM signal based on setting the DC-DC converter to a first phase associated with both buck and boost modes when a clock signal is asserted, and selecting a second phase associated with the buck mode of the DC-DC converter, if the sliding function signal achieves a first predetermined relationship with respect to a buck threshold before a next clock signal is asserted, or selecting a third phase associated with the boost mode of the DC-DC converter, if the sliding function signal achieves a second predetermined relationship with respect to a boost threshold before a next clock signal is asserted.

In one embodiment, a nonlinear DC-DC converter includes a measuring component configured and operable to measure a coil current and an output voltage during operation of the DC-DC converter, and a first summing component operable to obtain the difference between the output voltage and a reference voltage. The converter also includes a first amplifier operable to scale the measured coil current, a second amplifier operable to scale an integral of the difference between the output voltage and the reference voltage thereby providing an integral product, and a second summing component operable to sum the difference between the output voltage and the reference voltage, the first product, and the integral product in order to provide a sliding function used by the DC-DC converter.

In one embodiment, a method is disclosed for converting a first DC level to a second DC level based on a PWM signal derived from a coil current and an output voltage of a DC-DC converter. The method comprises receiving the output voltage and the coil current from the DC-DC converter, and generating the PWM signal. The PWM signal is generated based on setting the DC-DC converter to a first phase associated with both buck and boost modes when a clock signal is asserted. The method further includes selecting a second phase associated with the buck mode of the DC-DC converter, if the sliding function signal achieves a first predetermined relationship with respect to a buck threshold before a next clock signal is asserted, or selecting a third phase associated with the boost mode of the DC-DC converter, if the sliding function signal achieves a second predetermined relationship with respect to a boost threshold before a next clock signal is asserted.

The following description and annexed drawings set forth in detail certain illustrative aspects and implementations. These are indicative of only a few of the various ways in which the principles may be employed.

DETAILED DESCRIPTION

One or more implementations will now be described with reference to the attached drawings, wherein like reference numerals are used to refer to like elements throughout. Systems and methods are disclosed for a DC to DC (DC-DC) power converter, that includes a nonlinear controller configured to receive one or more feedback variables (e.g., output voltage and/or coil current) from the power stage, and is configured to generate a pulse width modulation (PWM) signal therefrom. The PWM signal is further generated based on setting the converter to a first phase shared by or associated with both buck and boost modes when a clock signal is asserted, and subsequently selecting a second phase associated with the buck mode if the sliding function signal achieves a buck threshold before a next clock signal is asserted, or selecting a third phase associated with the boost mode if the sliding function signal achieves a boost threshold before a next clock signal is asserted.

One prior art DC-DC converter has been implemented by using a PID (Proportional, Integral, Derivative) controller operating in different configurations according to the respective buck, boost, or buck/boost operation modes. When the PID based converter is operating in buck/boost mode, the prior art implementation requires the use of all 4 switches (typically with three switch configurations) of the power stage (or output stage) per switching period. In addition, this converter requires circuitry for detecting the required operating mode. The switching between the different modes is driven by the observation of a certain parameter such as the duty cycle, and occurs when a certain threshold is reached. Hysteresis is then introduced in order to prevent the converter from jumping continuously between the buck, boost, or buck/boost modes. In addition, when the converter changes between the modes of operation, the controller must be reconfigured and detrimentally causes a transient to typically occur in the output voltage. Further, the several converter reconfiguration changes typically use additional switching energy and thus shorten the life of mobile device power sources.

Accordingly, the improved DC-DC converter and operational methods presented herein seek to minimize this switching energy, to eliminate the transients due to configuration changes and to reduce the transients generated by line or load variations. In addition, the buck/boost mode of the present disclosure only requires two phases (switch configurations) of the power stage rather than the typical three phases. Moreover, only two switches are used in every switching period as opposed to prior art, where a 4-switch PWM mode is typically used. This leads to an improvement of the efficiency of the converter as the additional phase would increase the switching activity and therefore the energy needed to drive the switches of the power stage. Also the present system and method utilizes a single controller strategy in all operating conditions (buck or boost or buck/boost). As a result, no output voltage transients are generated when changing modes, and there are no hysteresis bands for the different operating modes, and therefore optimum utilization of the modes is provided. Moreover, in one embodiment, the selection of the operating mode is not taken at the beginning of the switching period, but on the fly during the period. This allows an optimal selection of the operating mode without a switching period delay.

Further, the disclosed strategy provides better dynamic performance, such as line and load changes, due to the nonlinear controller strategy, and the opportunity to use boost cycles for undershoot when the converter is in the buck operation mode, or to use buck cycles for overshoots when the converter is in the boost operation mode. Finally, the disclosed strategy provides improved robustness to parameter variations.

Accordingly, a control loop for a buck, boost, and buck/boost converter is provided which, in one embodiment, is able to operate with only two phases (switch configurations) and always with the same controller strategy without the need to separate and identify the three different (buck, boost, and buck/boost) modes of operation.

Figure 1:
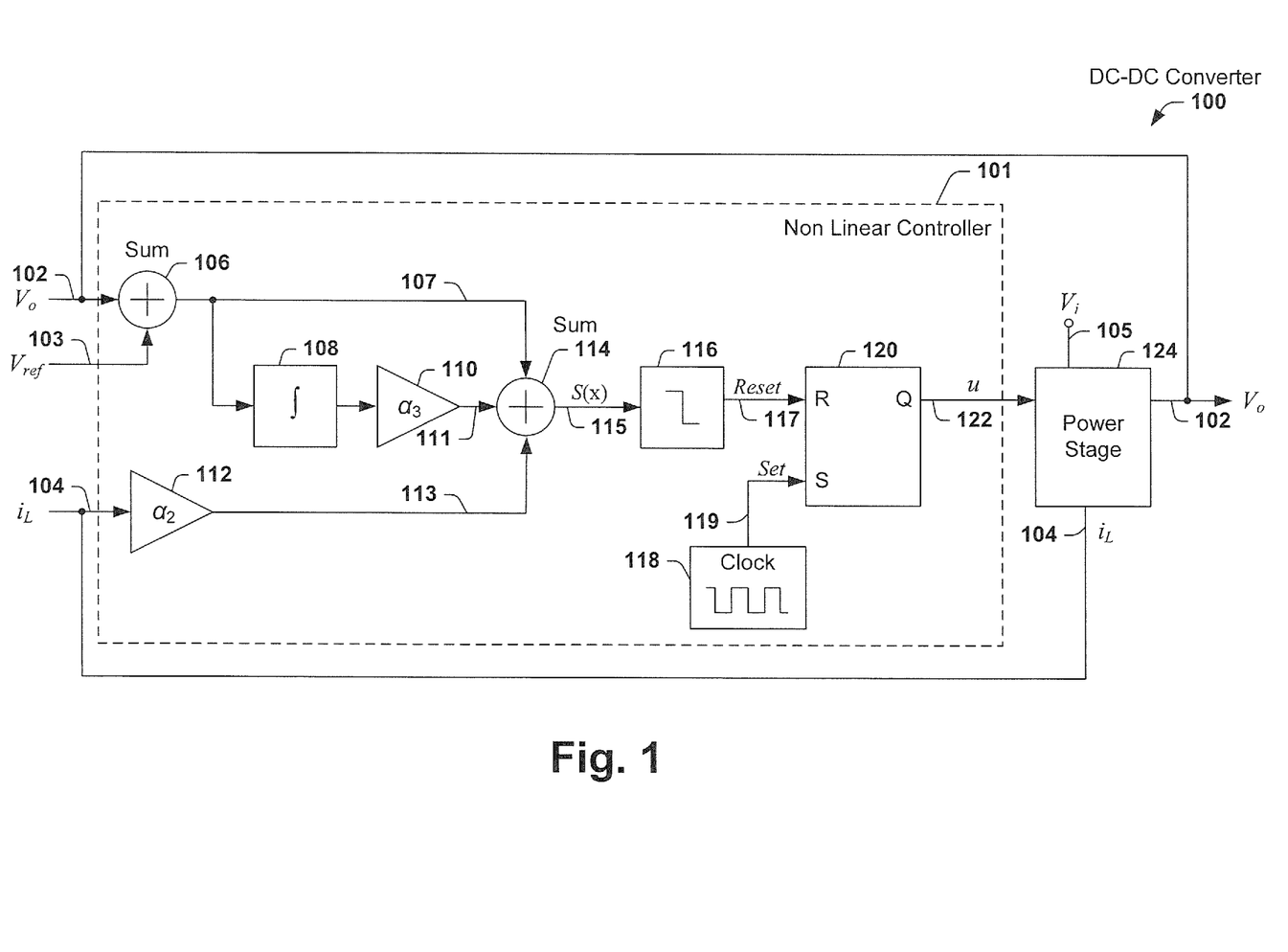
FIG. 1 is a simplified block diagram of a DC-DC converter having a nonlinear controller such as may be used in a mobile device in accordance with one embodiment of the disclosure.

Turning now to FIG. 1, a simplified block diagram of a DC to DC converter 100 having a nonlinear controller 101 and a power stage 124 is illustrated, such as may be used in a mobile device in accordance with one embodiment of the disclosure.

In one embodiment, the DC to DC converter 100 of FIG. 1 is used to convert a DC input voltage (Vi) 105 at one level to a desired DC output voltage (Vo) 102 at another level, and can accommodate the buck, boost, or buck/boost operating modes by selecting a switching configuration for one of either the buck or boost operating modes, or a switch configuration which is shared by the buck and boost modes. The DC to DC converter 100 includes the nonlinear controller 101 and a power stage 124. The nonlinear controller 101 is configured to receive the output voltage (Vo) 102 and a current $I_L$ 104 (e.g., coil current), and is configured to generate a pulse width modulation (PWM) signal μ 122 therefrom. The PWM signal 122 is further configured to be generated based on setting (e.g., via Set input S of flip-flop 120) the converter 100 to a switch configuration which is shared by buck and boost modes when a clock signal 119 (e.g., from an oscillator 118) is asserted, and subsequently selecting a buck mode of the converter 100, if the sliding function S(x) signal 115 achieves a first predetermined relationship (e.g., equals or exceeds a voltage or current) with respect to a buck threshold before a next clock signal 119 is asserted, or selecting a boost mode of the converter 100, if the sliding function S(x) signal 115 achieves a second predetermined relationship (e.g., equals or exceeds a voltage or current) with respect to a boost threshold before a next clock signal 119 is asserted. Thus generated, the PWM signal 122 may then be used by the converter 100 to control the switching of the power stage 124 to achieve one of the buck or boost operating modes (without simultaneously switching a 4-switch PWM) needed to generate the desired output voltage (Vo) 102 (e.g., to match a reference voltage (Vref) 103).

The output voltage (Vo) 102 and the coil current $I_L$ 104 are sensed from the power stage 124 and used as feedback to the nonlinear controller 101 based on the PWM signal 122 as controlled by the nonlinear controller 101. For example, and as will be discussed later in greater detail in association with FIG. 3, the power stage 124 is configured to scale the power (voltage×current) of the output voltage (Vo) 102, and may comprise four switches SW1-SW4 such as four MOSFET switches, that may be used for this purpose, however, other such power stage configurations are also contemplated.

In one embodiment of the disclosure, a buck/boost mode of operation (when the input voltage is close to the desired output voltage) is also functionally accommodated by alternately selecting the buck and boost mode switch configurations (see FIGS. 4A-4D). A common phase switch configuration (see FIGS. 4A & 4D) or intermediate switch configuration, is used at each clock signal 119 assertion, and only requires 2 switch changes between the buck and boost mode selections. Thus, between each mode, only 2 of the 4 switches require switching. Therefore, this concept also reduces switching energy and avoids switching transients by avoiding simultaneously switching all 4 switches of the power stage 124.

In one embodiment, the nonlinear controller 101 of the DC to DC converter 100 of FIG. 1, further comprises a measuring component (e.g., within the power stage 124) configured and operable to measure the coil current $I_L$ 104 and the output voltage (Vo) 102 during operation of the DC-DC converter 100. The example nonlinear controller 101 further includes a first summing component 106 operable to generate the difference between the output voltage (Vo) 102 and a reference voltage (Vref) 103 as a first sum 107, and a first amplifier $\alpha_2$ 112 (e.g., a first multiplier coefficient) operable to scale the measured coil current $I_L$ 104, thereby providing a scaled coil current 113. The nonlinear controller 101 also includes a second amplifier $\alpha_3$ 110 (e.g., a second multiplier coefficient) operable to scale an integral ∫ 108 of the first sum 107 thereby providing a first product 111. The nonlinear controller 101 also includes a second summing component 114 operable to sum the first sum 107, the first product 111, and the scaled coil current 113 in order to provide a sliding function S(x) 115 used by the nonlinear controller 101 to provide the nonlinear control of the DC to DC converter 100.

The nonlinear controller 101 further includes a comparator 116 configured to compare and determine if a value of the sliding function S(x) 115 has achieved one of a first predetermined relationship with respect to a buck threshold, or a second predetermined relationship with respect to a boost threshold (e.g., if the value equals or exceeds a predetermined threshold voltage or current associated with the buck or boost threshold). The nonlinear controller 101 also includes a latch (e.g., flip-flop) 120 configured to receive an output (Reset 117) from the comparator 116 and to reset the latch 120 based on the result of the comparison determination and to provide a PWM signal 122 at the output (e.g., Q of a flip-flop) of the latch 120, and an oscillator 118 operable to provide a clock signal 119 used to set the latch 120 upon each assertion of the clock signal 119, wherein the DC-DC converter 100 is set (e.g., S input of flip-flop 120) to a buck-boost mode when the clock signal 119 is asserted.

The DC-DC converter 100 is thus operable to provide a PWM signal 122 at the output (e.g., Q of a flip-flop) of the latch 120 based on the comparison determination (e.g., by comparator 116) of if the value of the sliding function S(x) 115 has achieved one of the first predetermined relationship with respect to a buck threshold before a next clock signal 119 is asserted, or the second predetermined relationship with respect to the boost threshold before a next clock signal 119 is asserted. The DC-DC converter 100 is therefore configured to operate in one of the buck or boost modes using the PWM signal 122 and based on the measured coil current $I_L$ 104 and the output voltage ($V_o$) 102 as used by the sliding function S(x) 115.

In operation, the clock signal is used to trigger the flip-flop and to set the output stage to a first phase or common phase (P1, as either buck ON or boost OFF switch configuration of the power stage) associated with both the buck and boost modes. The time duration of this common phase (P1) and the selection of the second phase (either buck OFF (P2) or boost ON (P3) switch configuration of the power stage) is based on the sliding function S(x) 115 of the state variables of the converter 100, where x=[$V_o$:$i_L$]. One embodiment of the sliding function S(x) 115, uses the output voltage $V_o$ and coil current $i_L$, as follows:

$$S(x)=(V_o-V_{ref})+\alpha_2 i_L+\alpha_3\int(V_o-V_{ref})dt \quad (1)$$

where:
S(x)=the sliding function,
$V_o$=the output voltage (e.g., from the power stage 124),
$V_{ref}$=a reference voltage,
$\alpha_2$=a first multiplier coefficient,
$\alpha_3$=a second multiplier coefficient,
$i_L$=the coil current (e.g., from the power stage 124).

Observations: In the equation (1) above, since the controller forces S(x)≈0 and the average value (over a switching period $T_{SW}$) of the coil current is <$i_L$>≠0, an integral term is needed t remove steady-state error. The coefficient $\alpha_2$ has the dimension of [Ω] and represents an equivalent sensing resistance.

Another embodiment of the sliding function S(x) 115, uses the output voltage $V_o$ and a reconstruction of the coil current, as follows:

$$S(x)=(V_o-V_{ref})+\alpha_2 v_r+\alpha_3\int(V_o-V_{ref})dt \quad (2)$$

Observations: In the equation (2) above, $v_r$ is a voltage that reproduces the coil current waveform. That is, $v_r$ is a voltage representative of the coil current. Here we don't need a direct measurement of the coil current. The reconstructed waveform can be obtained by using the battery and the output voltage only. Yet another embodiment of the sliding function S(x) 115, uses the output voltage $V_o$ only, as follows:

$$S(x)=(V_o-V_{ref})+\alpha_2 dV_o/dt+\alpha_3\int(V_o-V_{ref})dt \quad (3)$$

Observations: In the equation (3) above, the definition is similar to a PID controller. This embodiment provides a simple implementation as no current measurement or reconstruction is needed.

Figure 2:
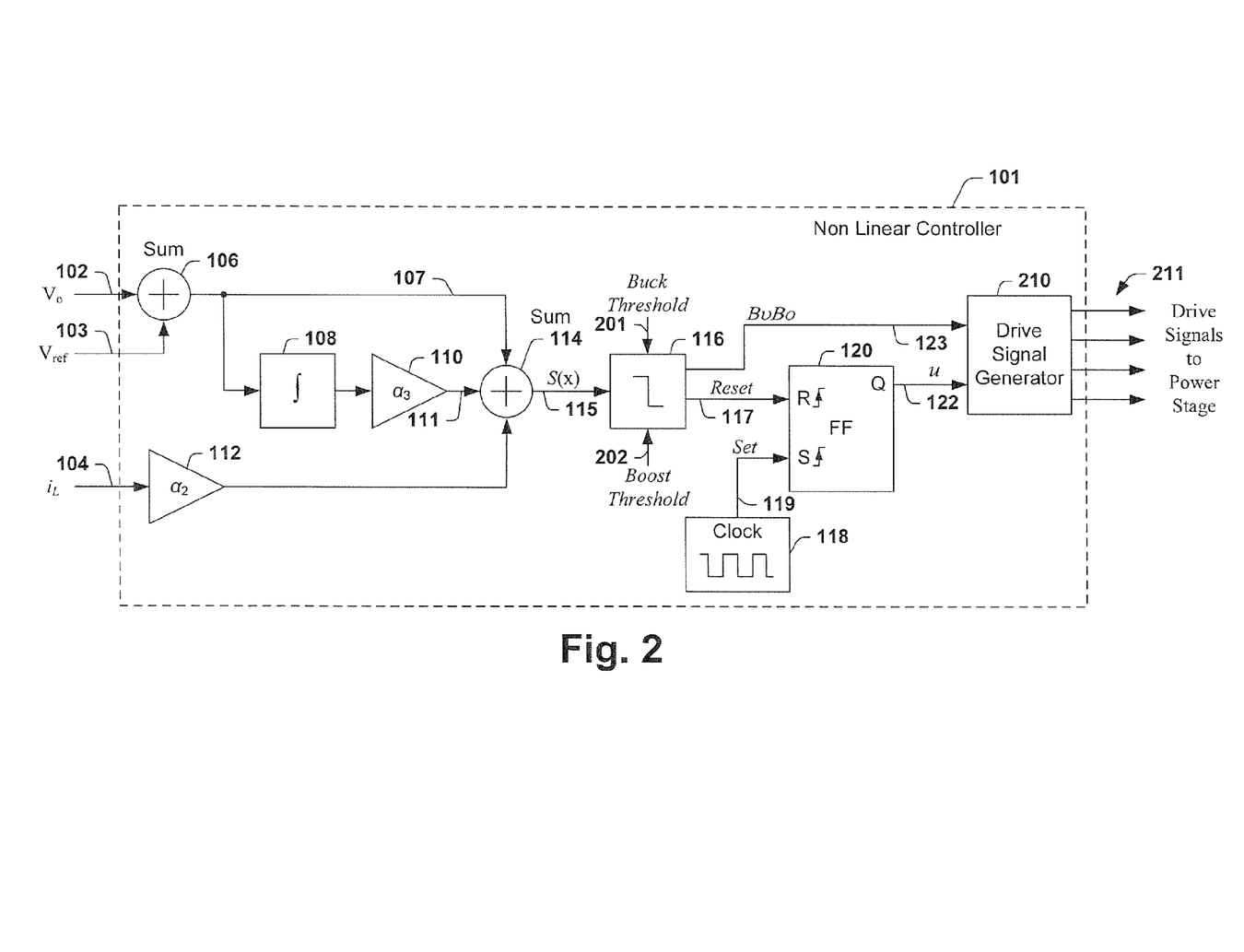
FIG. 2 is a more detailed block diagram of the nonlinear controller configured to utilize a sliding function and to operate in one of a buck, boost, or buck-boost modes in accordance with one embodiment of the disclosure.

FIG. 2 illustrates another simplified, but more detailed block diagram of the nonlinear controller 101 of the DC-DC converter 100 of FIG. 1, configured to utilize a sliding function such as S(x) 115, and to operate in one of a buck, boost, or buck-boost modes in accordance with one embodiment of the disclosure. The nonlinear controller 101 of FIG. 2 further illustrates that the comparator 116 may be configured to receive a buck threshold 201 and a boost threshold 202 as inputs to the comparator 116. With these inputs, the comparator 116 is configured to compare and determine if a value of the sliding function S(x) 115 has achieved one of a first predetermined relationship with respect to a buck threshold 201, or a second predetermined relationship with respect to a boost threshold 202. In response, the comparator 116 can provide a buck/boost (BuBo) mode select signal 123 to a drive signal generator 210, as well as the Reset 117 to the latch 120 based on the determined comparison results. That is, the comparator is able to determine, for example, if the value of the sliding function S(x) 115 equals or exceeds a predetermined threshold voltage or current associated with the buck threshold 201 or the boost threshold 202.

For example, the comparator 116 may determine, in accordance with equation (1) above, if the value of the sliding function S(x) 115 has exceeded a buck threshold voltage 201 of 4 volts, or has dropped below a boost threshold voltage 202 of 3 volts. Accordingly, if the value of the sliding function S(x) 115 is determined by the comparator 116 to have exceeded the buck threshold voltage 201 of 3.42 volts, the drive signal generator 210 is commanded, via BuBo mode select signal 123, to initiate a buck operation mode. Alternately, if the value of the sliding function S(x) 115 is determined by the comparator 116, to have dropped below a boost threshold voltage 202 of 3.38 volts, the drive signal generator 210 is commanded, via BuBo mode select signal 123, to initiate a boost operation mode. In response to the BuBo mode select signal 123 and the generated PWM signal 122, the drive signal generator 210 provides a plurality of drive signals 211 to the switches of the power stage 124, such as switches SW1-SW4 of the power stage 124 of FIG. 3.

Figure 3:
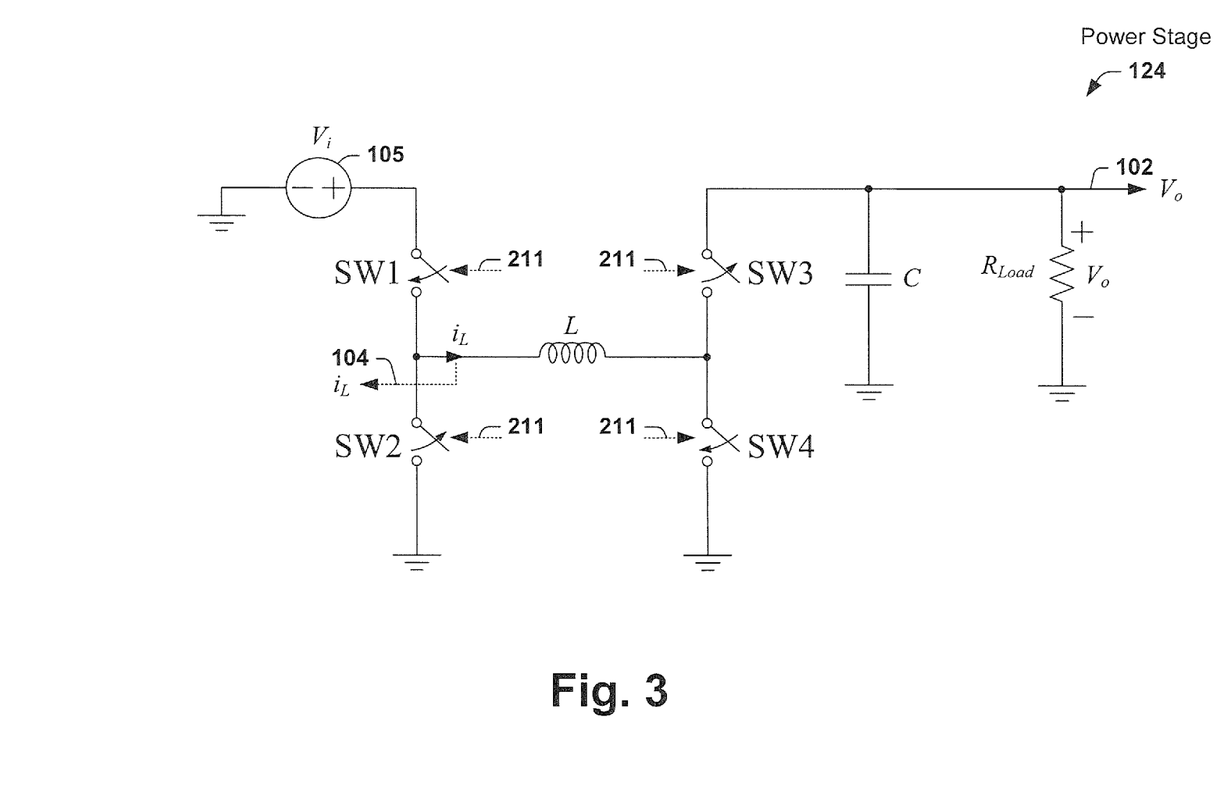
FIG. 3 is a simplified block diagram of one embodiment of a switching power stage such as may be used in the DC-DC converter of FIG. 1, in accordance with one embodiment of the disclosure.

FIG. 3 illustrates one embodiment of a switching power stage 124 such as may be used in the DC to DC converter 100 of FIG. 1, in accordance with one embodiment of the disclosure. The example power stage 124 of FIG. 3 illustrates a typical implementation of a non-inverting buck/boost converter which includes four switches SW1-SW4 such as four MOSFET switches which are controlled, for example, by the plurality of drive signals 211 from the drive signal generator 210. The power stage 124 further includes an inductor L arranged between the switches SW1-SW4, and a capacitor C to filter the output voltage ($V_o$) 102 to a load, such as load resistor $R_{Load}$. Other such power stage embodiments are also anticipated, for example, an inverting buck/boost converter having one switch and one diode, and wherein the switch(s) may include MOSFET switches, for example.

The example power stage 124 is configured to generate the output voltage ($V_o$) 102 and the coil current $I_L$ 104 as feedback for the nonlinear controller 101 of FIGS. 1 and 2. Depending on the available input voltage ($V_i$) 105, the power stage 124 is configured to operate in the buck, boost, and buck/boost operating modes to provide the desired output voltage ($V_o$).

FIGS. 4A-4D, for example, illustrate one embodiment of the buck and boost mode ON and OFF state switching configurations or phases of the exemplary switching power stage 124 of FIG. 3, in accordance with one embodiment of the disclosure. The figures further represent several different possible switch configurations, or phases of the buck, boost, or buck/boost modes.

Figure 4A:
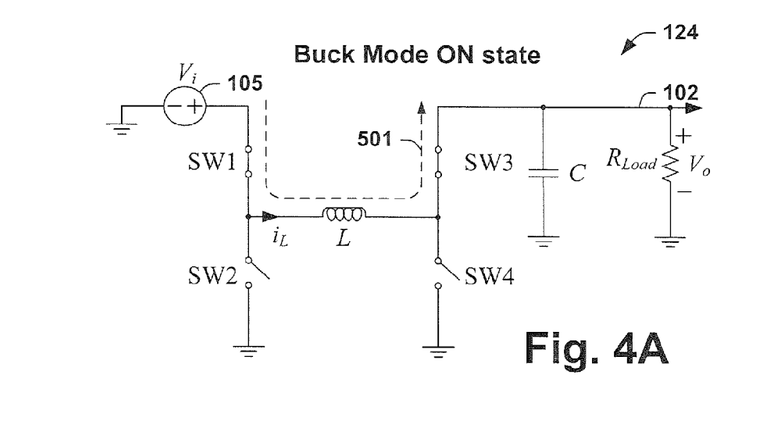
FIGS. 4A-4D are simplified block diagrams of one embodiment of the Buck and Boost mode ON and OFF states representing respective switch configurations or phases of the switching power stage of FIG. 3, in accordance with one embodiment of the disclosure.
Figure 4B:
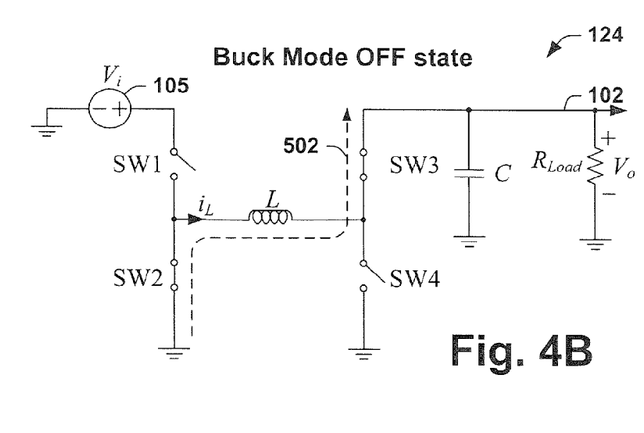
Figure 4C:
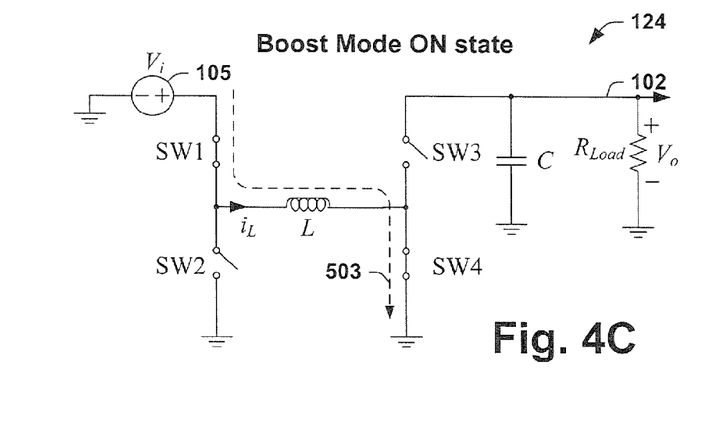
Figure 4D:
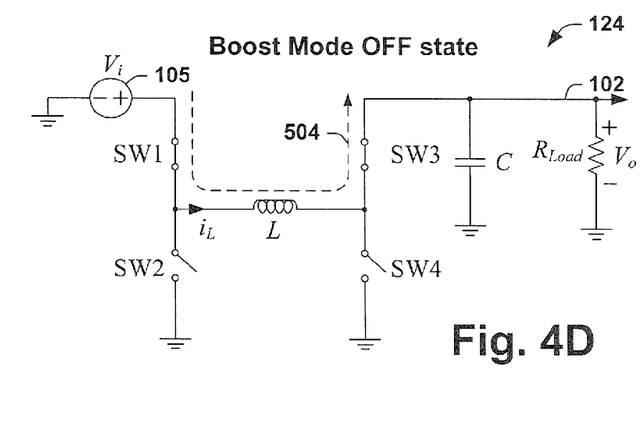

FIG. 4A illustrates the Buck mode ON state, where 501 represents the path of the $i_L$ 104 current flow thru switch SW1, the inductor L and switch SW4. FIG. 4B illustrates the Buck mode OFF state, where 502 represents the path of the $i_L$ 104 current flow thru switch SW2, the inductor L and switch SW3. FIG. 4C illustrates the Boost mode ON state, where 503 represents the path of the $i_L$ 104 current flow thru switch SW1, the inductor L and switch SW4. FIG. 4D illustrates the Boost mode OFF state, where 504 represents the path of the $i_L$ 104 current flow thru switch SW1, the inductor L and switch SW3.

In one prior art, in the buck mode (when the input voltage is larger than the output voltage) the switch SW3 is always closed and SW4 is always open. As a result, SW1 and SW2 are repeatedly switched on and off. In boost mode (when the input voltage is smaller than the desired output voltage) the switch SW1 is always closed and SW2 is always open. As a result, SW3 and SW4 are repeatedly switched on and off. For a buck/boost operation (when the input voltage is close to the desired output voltage) in the prior art solution, all four switches (typically with three phases, e.g. the three phases of FIGS. 4A/4D, 4B and 4C) are used for each switching period.

The disadvantage of this prior art implementation is that when the converter moves from the third phase back to the first phase, all four switches of the power stage need to change their state. This complete reconfiguration of the switches leads to an increase of the energy dissipated to drive all the switches by 100% compared to the buck or boost switch configurations and therefore to a large degradation in the switching efficiency. Thus, to save switching energy between any two of the operating modes, a technique that requires a smaller portion of the power switches to change may be useful in improving switching efficiency.

By contrast to prior art, the proposed solution always uses two phases (switch reconfigurations) and then only changes the state of just two switches or no more than half of the switches for every switching period (each clock cycle or clock signal assertion). To accomplish this goal, the inventors have observed that the ON phase of the buck mode (see FIG. 4A) and the OFF state of the boost mode (see FIG. 4D) have the same switch configuration (e.g., SW1=ON, SW2=OFF, SW3=ON, SW4=OFF), and have advantageously utilized this common phase switch configuration. In this respect, the common phase is associated with (shared by) both buck and boost modes of the converter, because the buck ON switch configuration or phase (see FIG. 4A) is the same as the boost OFF switch configuration or phase (see FIG. 4D).

In one embodiment of the disclosure, this common phase or first phase (P1) switch configuration of the power stage 124 of FIGS. 4A and 4D (Buck mode ON state and Boost mode OFF state), is forced at the beginning of each switching period (synchronous operation) when a clock command (e.g., clock signal 119) is asserted. The duration of this first phase (P1) is set by the nonlinear controller 101 as follows. Before the end of this first phase (P1) the controller 101 either selects the switch configuration of either the OFF phase of the buck mode (the second phase (P2), see FIG. 4B) or the ON phase of the boost mode (the third phase (P3), see FIG. 4C). The decision about the operation mode (e.g., buck or boost) and the corresponding switch configuration selection is therefore made on the fly in the middle of a switching period (between clock signal 119 assertions) based on the computed value of the control function called the sliding function S(x) previously described above. In contrast to prior art, where the mode is typically applied at the beginning of the following switching period, and as a result may incur a delay of up to one switching period, in the present embodiment the selection of the operation mode is immediate during the current switching period.

Figure 5:
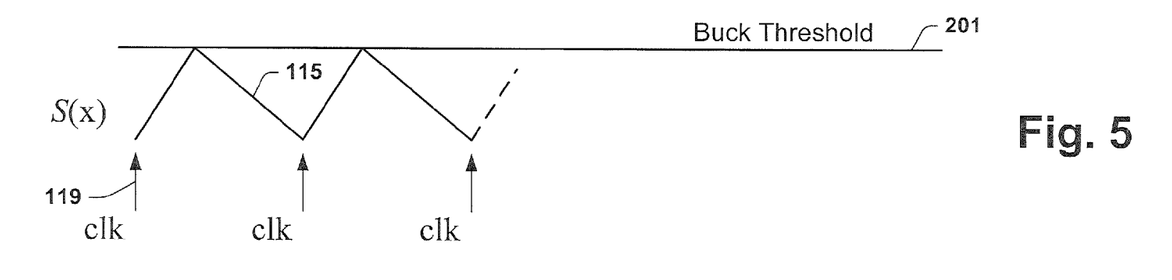
FIG. 5 is a plot of the sliding function of the nonlinear controller of FIGS. 1 and 2, operating in the buck operating mode, in accordance with one embodiment of the disclosure.

Here again, in one embodiment of the disclosure, the buck/boost mode of operation (when the input voltage is close to the desired output voltage) is also functionally accommodated by alternately selecting the buck and boost mode switch configurations (FIGS. 4A-4D). The common phase switch configuration (FIGS. 4A & 4D) or intermediate switch configuration, is used at each clock signal 119 assertion, and only requires 2 switch changes between the buck and boost mode selections. Thus, between each mode, only 2 of the 4 switches require switching. Therefore, this concept also reduces switching energy and avoids switching transients by avoiding simultaneously switching all 4 switches of the power stage 124. FIG. 5 illustrates a plot of the sliding function S(x) signal 115 of the nonlinear controller 101 of FIGS. 1 and 2, operating in the buck operating mode, in accordance with one embodiment of the disclosure.

Figure 6:
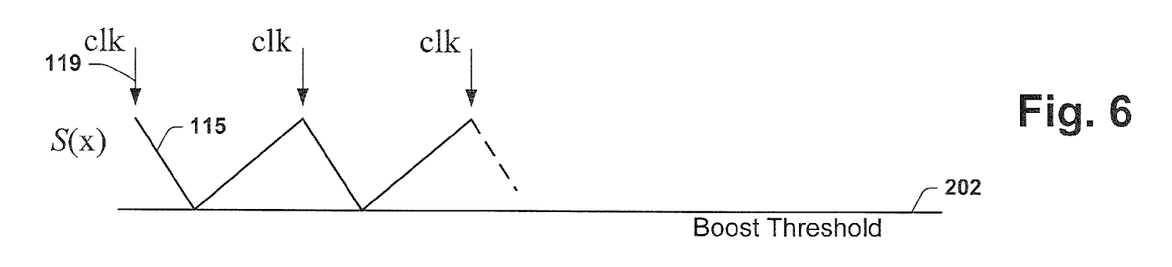
FIG. 6 is a plot of the sliding function of the nonlinear controller of FIGS. 1 and 2, operating in the boost operating mode, in accordance with one embodiment of the disclosure.

FIG. 6 illustrates a plot of the sliding function S(x) signal 115 of the nonlinear controller 101 of FIGS. 1 and 2, operating in the boost operating mode, in accordance with one embodiment of the disclosure.

If we assume the sliding function S(x) signal 115 is operating in a steady state in the buck operation mode (input voltage ($V_i$) 105 larger than output voltage ($V_o$) 102) during phase P1, the slope of sliding function S(x) signal 115 is positive (after the clock signal 119 is asserted) due to the fact that the coil current $i_L$ 104 increases (see FIG. 5). On the other hand, in the boost operation mode (input voltage ($V_i$) smaller than output voltage ($V_o$)) during phase P1, the slope of sliding function S(x) signal 115 is negative (after the clock signal 119 is asserted) due to the fact that the coil current $i_L$ 104 decreases (see FIG. 6).

Based on the observation of FIGS. 5 and 6 above, it is possible to define two thresholds corresponding to the buck and boost operating modes. After the clock signal 119 is asserted and when the sliding function S(x) signal 115 reaches one of the two thresholds (e.g., the Buck threshold 201 of FIG. 5 or the Boost threshold 202 of FIG. 6) the flip flop (e.g., 120 of FIGS. 1 and 2) is reset (at the end of the phase P1). The second phase is selected from among the switch configurations associated with phases P2 or P3 according to which of the two thresholds (Buck threshold 201 or Boost threshold 202) is crossed, for example.

Figure 7:
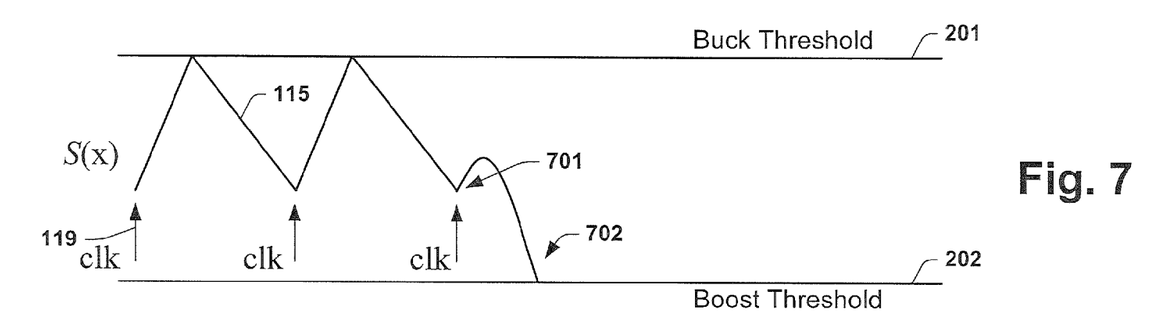
FIG. 7 is a plot of the sliding function of the nonlinear controller of FIGS. 1 and 2, when the operating mode is changed from Buck to Boost operating mode, in accordance with one embodiment of the disclosure.

FIG. 7 illustrates one example of a plot of the sliding function S(x) signal 115 of the nonlinear controller 101 of FIGS. 1 and 2, when the operating mode is changed from Buck to Boost operating mode, in accordance with one embodiment of the disclosure. FIG. 7 also illustrates that both the Buck threshold 201 of FIG. 5 and the Boost threshold 202 of FIG. 6 may be combined, as in the comparator 116 of FIG. 2. Accordingly, after the clock signal 119 is asserted and when the sliding function S(x) signal 115 reaches one of the two thresholds (e.g., the Buck threshold 201 of FIG. 5 or the Boost threshold 202 of FIG. 6) the flip flop (e.g., 120 of FIGS. 1 and 2) is reset (at the end of the phase P1). As before, the second phase is then selected from among the switch configurations associated with phases P2 or P3 according to which of the two thresholds (Buck threshold 201 or Boost threshold 202) is crossed, for example.

FIG. 7 further indicates, for example, that after the clock signal 119 is asserted at 701, the sliding function S(x) signal 115 begins decreasing, for example, as a result of the coil current $i_L$ 104 decreasing (see 702 of FIG. 7) toward the Boost threshold 202 of FIG. 7.

Figure 8:
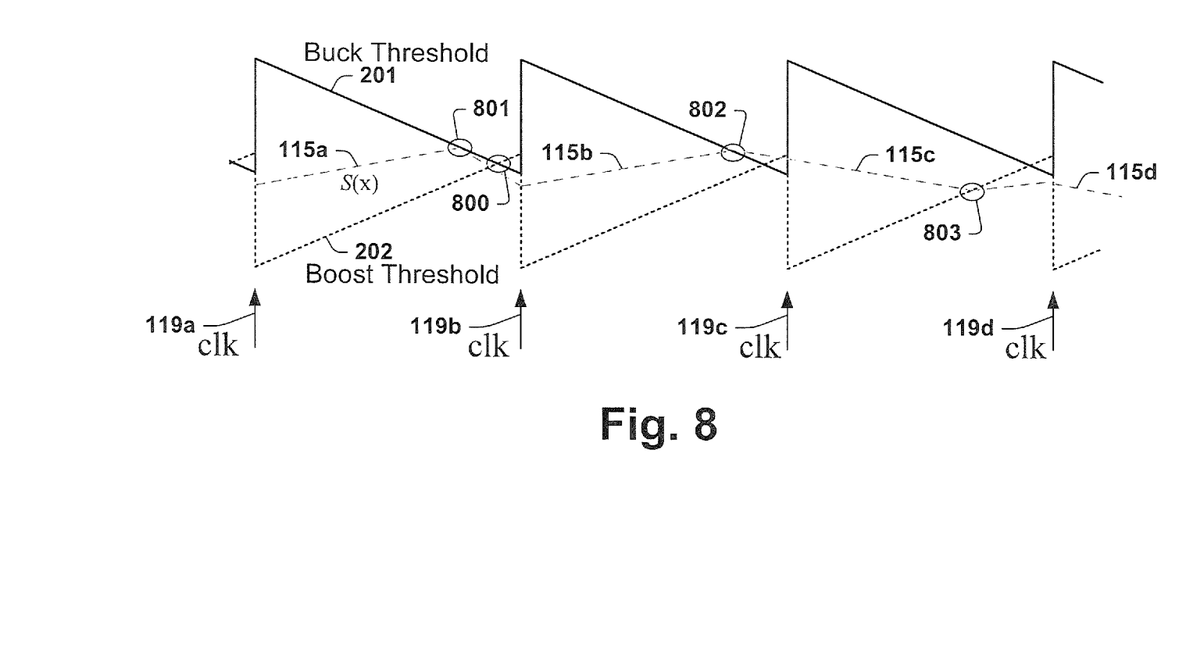
FIG. 8 is a plot of the sliding function of the nonlinear controller of FIGS. 1 and 2, utilizing both Buck and Boost thresholds having slope compensation, the sliding function operating in Buck and Boost modes, in accordance with one embodiment of the disclosure.

FIG. 8 illustrates a plot of the sliding function S(x) signal 115 of the nonlinear controller 101 of FIGS. 1 and 2, utilizing both Buck threshold 201 and Boost threshold 202 having slope compensation, the sliding function S(x) signal 115 operating in Buck and Boost modes, in accordance with one embodiment of the disclosure.

In another embodiment of the disclosure, the nonlinear controller 101 may be configured with slope compensation to avoid static instability in the converter 100. In one embodiment, this is achieved by adding a sawtooth signal to both thresholds 201 and 202 as shown in FIG. 8. If the amplitude of the sawtooth signal is chosen such that the thresholds 201/202 intersect 800 before the end of the switching period (before the next clock signal 119*a* . . . 119*d* is asserted), as shown in FIG. 8, the controller 101 is forced to select one of the operating modes (buck or boost modes) before the next clock signal 119*a* . . . 119*d* is asserted. This approach is particularly beneficial when the input and output voltages are close (buck/boost mode) and the converter 101 must switch repeatedly between buck and boost modes. This approach also ensures a constant switching frequency, for example, for applications having this requirement or for RF applications where it is desirable to know the switching frequency.

For example, the sliding function S(x) signal 115*a* is forced into a first phase (P1) the Buck mode ON state (see FIG. 4A) which is also the Boost mode OFF state (see FIG. 4D) when clock signal 119*a* is asserted, and sliding function S(x) signal 115*a* increases as a result of the coil current $i_L$ 104 increasing until it crosses (equals the level of) the Buck threshold 201 at 801 of FIG. 8. At 801, the flip-flop (latch) 120 of FIGS. 1 and 2 is then reset via Reset signal 117 output from comparator 116, because the sliding function S(x) signal 115*a* has achieved the Buck threshold 201 of comparator 116. The duration that latch FF 120 remains reset, is determined by the time remaining between point 801 and the next clock signal assertion 119*b* of FIG. 89. While FF 120 remains reset, PWM signal 122 controls the drive signal generator 210 of FIG. 2 to select the Buck mode OFF switch configuration (see FIG. 4B) or phase (P2), before the next clock signal 119*b* is asserted.

At the 119*b* clock signal assertion, the P1 Buck ON phase is again forced, being set in latch/FF 120, and sliding function S(x) signal 115*b* also increases until it crosses/equals the level of the Buck threshold 201 at 802 of FIG. 8. At 802, the Buck mode OFF switch configuration (see FIG. 4B) or phase (P2) is selected before the next clock signal 119*c* is asserted.

At the 119*c* clock signal assertion, the P1 Buck ON phase is again forced, being set in FF 120 by clock signal 119, and sliding function S(x) signal 115*c* now decreases until it crosses/equals the level of the Boost threshold 202 at 803 of FIG. 8. As a result, at 803, the controller is forced to select the Boost mode ON switch configuration (see FIG. 4C) or phase (P3) before the next clock signal 119*d* is asserted.

This time, and because the Boost mode ON switch configuration (P3) was last utilized, when the P1 common phase switch configuration is again forced at the 119*d* clock signal assertion, the P1 phase serves as a Boost OFF phase (see FIG. 4D). Thus, sliding function S(x) signal 115*d* now starts from a slightly higher plot position, as shown in FIG. 8 before the 119*d* clock signal assertion.

Thus, it may be seen that because the buck threshold 201 and the boost threshold 202 sawtooth waveforms intersect (e.g., at 800 of FIG. 8) before the clock signal 119 is asserted, the controller 101 is forced to select one of the buck or boost operating modes before the next clock signal 119 is asserted. That is, the comparator 116 of the nonlinear controller 101 of FIG. 2 determines, for example, if the value of the sliding function S(x) signal 115 equals or exceeds a predetermined threshold voltage or current associated with the buck threshold 201 or the boost threshold 202 before the next clock signal 119 is asserted. In response, the nonlinear controller 101 selects drive signals 211 from the drive signal generator 210 corresponding with a phase or switching configuration associated with one of the buck mode or boost mode based on the PWM signal 122 and the BuBo mode select signal 123.

In another embodiment, one or more of the buck threshold 201 and the boost threshold 202 comprise a sawtooth waveform or a ramp waveform.

In one embodiment, both the buck threshold 201 and the boost threshold 202 comprise sawtooth waveforms that intersect 800 before a next clock signal 119 is asserted. Alternately, the buck threshold 201 and the boost threshold 202 may comprise waveforms that intersect (e.g., at 800 of FIG. 8).

In another embodiment, the sliding function S(x) signal 115 achieving the first predetermined relationship with respect to the buck threshold 201 comprises the value of the sliding function S(x) signal 115 equaling, crossing or exceeding a first predetermined value of the buck threshold 201, and the sliding function S(x) signal 115 achieving the second predetermined relationship with respect to the boost threshold 202 comprises the value of the sliding function S(x) signal 115 equaling, crossing or exceeding (in magnitude) or falling below a second predetermined value of the boost threshold 202.

Thus, the DC-DC converter 100 is configured to operate in one of the buck, boost and buck-boost modes using the sliding function S(x) signal 115, the PWM signal 122 and based on the measured output voltage ($V_o$) 102 and the coil current $I_L$ 104.

Although a nonlinear DC-DC converter 100 is illustrated and discussed herein, which may include some or all of the illustrated components, it will also be appreciated by those skilled in the art that one or more of the components or circuits shown in the converter 100 of FIGS. 1 and 2 may be provided by a DC-AC converter, an AC-DC converter, and as such are also contemplated. In addition, the nonlinear controller 101 may include elements of a linear controller.

While the converter 100 of FIGS. 1 and 2 are described herein with one or more identified summers, amplifiers, integrators, comparators, latches, oscillators or digitally controlled oscillators (DCO), signal generators, and the power stage 124 described herein with one or more switches, LR circuits and filters, as one example, it should be understood that many variations of such components and features can be made, and all such variations are contemplated as falling within the scope of the disclosure. Such DC-DC converters and DC and AC power converters and other such power conversions can also be carried out by other hardware and software means also contemplated within the scope of the disclosure, and all such variations and combinations of the aforementioned are contemplated herein.

By contrast to prior art systems, the DC-DC power converter 100 of FIGS. 1 and 2 achieve improved buck/boost performance in only two phases per clock cycle rather than three phases, achieving reduced switching energy as a result of requiring fewer switch reconfigurations of the power stage between the phases, and as a result does so with no output voltage transients, and also without requiring hysteresis bands. In addition, the power converter system achieves better dynamic performance as a result of the nonlinear controller strategy and can utilize the boost mode for undershoots when in buck mode operation, and can utilize the buck mode for overshoots when in the boost mode operation. Further, the control loop of the converter is able to operate with only two phases without separately identifying the three different modes of operation (buck, boost, and buck/boost modes).

In addition to or in substitution of one or more of the illustrated components, the illustrated one or more identified summers, amplifiers, integrators, comparators, latches, oscillators or digitally controlled oscillators (DCO), signal generators, power stages, switches, filters, and other systems of the disclosure may include suitable circuitry, state machines, firmware, software, logic, etc. to perform the various methods and functions illustrated and described herein, including but not limited to the method(s) described below.

In one embodiment, a method is disclosed for converting a first DC level (e.g., input voltage ($V_i$) 105) to a second DC level (e.g., output voltage ($V_o$) 102) based on a PWM signal 122 derived from a current (e.g., coil current $I_L$ 104) and an output voltage ($V_o$) 102 of a DC-DC converter (e.g., 100 of FIGS. 1 and 2).

The method includes receiving the output voltage ($V_o$) 102 and the coil current $I_L$ 104 from the DC-DC converter 100. The method also includes generating the PWM signal 122 based on setting the DC-DC converter 100 to a first phase (e.g., common phase P1 switch configuration of FIGS. 4A/4D) associated with both buck and boost modes (see FIGS. 4A-4D) of the converter 100 when a clock signal 119 is asserted.

The method further includes either selecting a second phase (e.g., a switch configuration) associated with the buck mode (e.g., Buck mode OFF state switch configuration of FIG. 4B) of the DC-DC converter 100, if a sliding function S(x) signal 115 achieves a first predetermined relationship (e.g., the sliding function signal voltage or current equals or exceeds the predetermined threshold) with respect to a buck threshold (e.g., 201 of FIGS. 2 and 5-8) before a next clock signal 119 is asserted, or selecting a third phase (e.g., a switch configuration) associated with the boost mode (e.g., Boost mode ON state switch configuration of FIG. 4C) of the DC-DC converter 100, if the sliding function S(x) signal 115 achieves a second predetermined relationship (e.g., the sliding function signal voltage or current equals or exceeds the predetermined threshold) with respect to a boost threshold (e.g., 202 of FIGS. 2 and 5-8) before a next clock signal 119 is asserted.

The method may further include providing the coil current (e.g., coil current $I_L$ 104) and scaling the power (e.g., with an amplifier) of the output voltage ($V_o$) 102 utilizing a power stage (e.g., 124 of FIG. 3) of the DC-DC converter 100 based on the sliding function S(x) signal 115 and the PWM signal 122.

In another embodiment, the PWM signal 122 together with the buck/boost mode select signal bubo 123 controls the switch mode power stage 124 of the DC-DC converter 100 to operate in one of the buck, boost and buck-boost modes based on the measured coil current $I_L$ 104 and output voltage ($V_o$) 102, and wherein after setting the PWM signal 122 to the first phase (e.g., common phase P1 switch configuration of FIGS. 4A/4D) associated with both buck and boost modes using the clock signal 119, only one of the second phase and third phase (e.g., one of FIG. 4B or 4C switch configurations) is selected between successive clock signal 119 assertions.

Although the disclosure has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:
1. A nonlinear converter, comprising:
  a nonlinear controller configured to receive an output voltage and configured to generate a PWM signal based on:
    setting the converter to a first phase associated with both buck and boost modes of the converter, when a clock signal is asserted; and selecting a second phase associated with the buck mode of the converter, if a sliding function signal achieves a first predetermined relationship with respect to a buck threshold before a next clock signal is asserted, or selecting a third phase associated with the boost mode of the converter, if the sliding function signal achieves a second predetermined relationship with respect to a boost threshold before a next clock signal is asserted, a power stage configured to generate the output voltage for the nonlinear controller based on the PWM signal from the nonlinear controller, wherein the sliding function signal is generated by a sliding function of the converter, the sliding function comprising a summation of feedback variables from the power stage, wherein the feedback variables comprise the output voltage, a coil current, and a processed value that is a function of the output voltage.

2. The nonlinear converter of claim 1, wherein the nonlinear controller is configured to receive a current.

3. The nonlinear converter of claim 1, comprising a DC-DC converter.

4. The nonlinear converter of claim 1, wherein the first phase that is generated when the clock signal is asserted, comprises one of a buck ON and a boost OFF phase corresponding to a common phase shared by or associated with both the buck and boost modes.

5. The nonlinear converter of claim 4, wherein selecting the second phase comprises selecting a buck OFF mode after the common phase is set by the clock signal and before a next clock signal is asserted, and selecting the third phase comprises selecting a boost ON mode after the common phase is set by the clock signal and before a next clock signal is asserted.

6. The nonlinear converter of claim 1, wherein one or more of the buck threshold and the boost threshold comprise a compensation waveform.

7. The nonlinear converter of claim 6, wherein the compensation waveform comprises a sawtooth waveform.

8. The nonlinear converter of claim 1, wherein both the buck threshold and the boost threshold comprise sawtooth waveforms that intersect before a next clock signal is asserted.

9. The nonlinear converter of claim 1, wherein the sliding function signal achieving the first predetermined relationship with respect to the buck threshold comprises the value of the sliding function signal equaling, crossing or exceeding a first predetermined value of the buck threshold, and the sliding function signal achieving the second predetermined relationship with respect to the boost threshold comprises the value of the sliding function signal equaling, crossing or exceeding a second predetermined value of the boost threshold.

10. A nonlinear DC-DC converter, comprising:
a power stage configured to provide a coil current and an output voltage based on a PWM signal; and
a nonlinear controller configured to receive the output voltage and the coil current from the power stage, and configured to generate the PWM signal based on:
setting the DC-DC converter to a first phase associated with both buck and boost modes of the converter when a clock signal is asserted; and
selecting a second phase associated with the buck mode of the DC-DC converter, if a sliding function signal achieves a first predetermined relationship with respect to a buck threshold before a next clock signal is asserted, or
selecting a third phase associated with the boost mode of the DC-DC converter, if the sliding function signal achieves a second predetermined relationship with respect to a boost threshold before a next clock signal is asserted,
wherein the sliding function signal is generated by a sliding function of the converter, the sliding function comprising a summation of feedback variables from the power stage,
wherein the feedback variables comprise the output voltage, a coil current, and a processed value that is a function of the output voltage.

11. The nonlinear converter of claim 10, wherein both the buck threshold and the boost threshold comprise sawtooth waveforms that intersect.

12. The nonlinear converter of claim 10, wherein the sliding function signal achieving the first predetermined relationship with respect to the buck threshold comprises the value of the sliding function signal equaling a first predetermined value of the buck threshold, and the sliding function signal achieving the second predetermined relationship with respect to the boost threshold comprises the value of the sliding function signal equaling a second predetermined value of the boost threshold.

13. The nonlinear converter of claim 10, wherein the power stage is configured to scale the power of the output voltage.

14. A nonlinear DC-DC converter, comprising:
a power stage configured to provide a coil current and an output voltage based on a PWM signal; and
a nonlinear controller configured to receive the output voltage and the coil current from the power stage, and configured to generate the PWM signal based on:
setting the DC-DC converter to a first phase associated with both buck and boost modes of the converter when a clock signal is asserted; and
selecting a second phase associated with the buck mode of the DC-DC converter, if a sliding function signal achieves a first predetermined relationship with respect to a buck threshold before a next clock signal is asserted, or
selecting a third phase associated with the boost mode of the DC-DC converter, if the sliding function signal achieves a second predetermined relationship with respect to a boost threshold before a next clock signal is asserted,
wherein the sliding function signal functions in accordance with a sliding function represented by:

$$S(x)=(V_o-V_{ref})+\alpha_2 i_L+\alpha_3\int(V_o-V_{ref})dt$$

where:
$S(x)$=the sliding function,
$V_o$=the output voltage from the power stage,
$V_{ref}$=a reference voltage,
$\alpha_2$=a first multiplier coefficient,
$\alpha_3$=a second multiplier coefficient,
$i_L$=the coil current from the power stage.

15. A nonlinear DC-DC converter, comprising:
a measuring component configured and operable to measure a coil current and an output voltage during operation of the DC-DC converter;
a first summing component operable to obtain the difference between the output voltage and a reference voltage;

a first amplifier operable to scale the coil current, thereby providing a scaled coil current;

a second amplifier operable to scale an integral of the difference between the output voltage and the reference voltage thereby providing an integral product;

a second summing component operable to sum the difference between the output voltage and the reference voltage, the scaled coil current, and the integral product in order to provide a sliding function used by the DC-DC converter.

16. The nonlinear DC-DC converter of claim 15, further comprising
a comparator configured to compare and determine if a value of the sliding function has achieved one of a first predetermined relationship with respect to a buck threshold, or a second predetermined relationship with respect to a boost threshold;
a latch configured to receive an output of the comparator and to reset the latch based on the result of the comparison determination and to provide a PWM signal at the output of the latch; and
an oscillator operable to provide a clock signal used to set the latch upon each assertion of the clock signal, wherein the DC-DC converter is set to a first phase associated with both buck and boost modes of the converter when the clock signal is asserted;

wherein the DC-DC converter is operable to provide a PWM signal at the output of the latch based on the comparison determination of if the value of the sliding function has achieved one of the first predetermined relationship with respect to a buck threshold before a next clock signal is asserted, or the second predetermined relationship with respect to the boost threshold before a next clock signal is asserted, and wherein the DC-DC converter is configured to operate in one of the buck or boost modes using the PWM signal and based on the measured coil current and output voltage as used by the sliding function.

17. The nonlinear DC-DC converter of claim 16, further comprising a switch mode power stage configured to scale the power of the output voltage based on the PWM signal, and to provide the coil current.

18. The nonlinear DC-DC converter of claim 17, wherein the PWM signal controls the switch mode power stage of the DC-DC converter to operate in one of the buck or boost modes based on the measured coil current and output voltage, and wherein after setting the PWM signal to the first phase associated with both buck and boost modes of the converter using the clock signal, only one of the buck and boost modes is selected between successive clock signal assertions.

* * * * *